US 8,224,996 B2

(12) United States Patent
Hazlewood et al.

(10) Patent No.: US 8,224,996 B2
(45) Date of Patent: Jul. 17, 2012

(54) DIRECTORY VIEWPORTS

(75) Inventors: Kristin M. Hazlewood, Austin, TX (US); John M. McConaughy, Austin, TX (US); Gary D. Williams, Driftwood, TX (US)

(73) Assignee: International Business Machines Corporation, Armonk, NY (US)

( * ) Notice: Subject to any disclaimer, the term of this patent is extended or adjusted under 35 U.S.C. 154(b) by 222 days.

(21) Appl. No.: 12/345,018

(22) Filed: Dec. 29, 2008

(65) Prior Publication Data

US 2010/0169485 A1    Jul. 1, 2010

(51) Int. Cl.
*G06F 15/16* (2006.01)

(52) U.S. Cl. ........ 709/246; 709/217; 709/219; 709/225; 707/722; 707/754

(58) Field of Classification Search .................. 709/217, 709/219, 225, 246; 707/722, 754
See application file for complete search history.

(56) References Cited

U.S. PATENT DOCUMENTS

| | | | |
|---|---|---|---|
| 6,490,619 B1 | 12/2002 | Byrne et al. | |
| 6,513,038 B1 | 1/2003 | Hasegawa et al. | |
| 6,553,368 B2* | 4/2003 | Martin et al. | 1/1 |
| 6,768,988 B2 | 7/2004 | Boreham et al. | |
| 7,185,192 B1* | 2/2007 | Kahn | 713/155 |
| 7,213,018 B2* | 5/2007 | Rowley | 707/754 |
| 7,296,022 B2* | 11/2007 | Harjanto | 1/1 |
| 7,865,482 B2* | 1/2011 | Barchi et al. | 707/694 |
| 2004/0122977 A1* | 6/2004 | Moran et al. | 709/246 |
| 2006/0168255 A1* | 7/2006 | Katz et al. | 709/229 |
| 2008/0091790 A1* | 4/2008 | Beck | 709/217 |
| 2010/0042570 A1* | 2/2010 | Mayers et al. | 706/46 |

* cited by examiner

*Primary Examiner* — Duyen Doan
(74) *Attorney, Agent, or Firm* — Francis Lammes; Stephen J. Walder, Jr.; Jeffrey S. LaBaw

(57) ABSTRACT

The illustrative embodiments provide for filtering LDAP requests and server responses. A viewport server is configured with filtering rules for responses from a directory server where the responses are generated to fulfill requests from a client application. The filtering rules determine which data is to be forwarded to the client application. One or more responses are intercepted from the directory server to the client application. The one or more intercepted responses are filtered according to the filtering rules to produce a set of filtered responses. The set of filtered responses are then sent to the client application.

23 Claims, 3 Drawing Sheets

DIRECTORY VIEWPORTS

BACKGROUND

The present application relates generally to an improved data processing apparatus and method and more specifically to an apparatus and method for providing a set of viewports where each viewport provides a different view of content in a directory.

A directory server provides a centralized directory service for intranet, network, and extranet information. Directory servers integrate with existing systems and act as a centralized repository for the consolidation of employee, customer, supplier, and partner information. Directory servers may be extended to manage user profiles and preferences, as well as extranet user authentication.

Usually, the front end of a directory server is a lightweight directory access protocol (LDAP). LDAP provides a common language that client applications and directory servers use to communicate with one another. LDAP is a "lightweight" version of the directory access protocol (DAP) used by the International Organization for Standardization (ISO) X.500 standard. DAP gives any application access to the directory via an extensible and robust information framework, but at an expensive administrative cost. DAP uses a communications layer (Open Systems Interconnection (OSI) stack) that is not the Internet standard Transmission Control Protocol/Internet Protocol (TCP/IP) protocol and has complicated directory-naming conventions. The current version of LDAP is 3 (LDAPv3), which is described by several Request for Comments (RFCs), RFCs-2251 through 2256 and others. There is currently a Lightweight Directory Access Protocol V3 Revision Working Group (LDAPbis) Internet Engineering Task Force (IETF) working group which is revising these old RFCs.

A directory server stores information in a tree-like hierarchical structure and may be characterized by very fast read operations, fairly static data, hierarchical, clients use standard LDAP protocol, and loosely coupled replication. LDAP preserves the best features of DAP while reducing administrative costs. LDAP uses an open directory access protocol running over TCP/IP and uses simplified encoding methods. LDAP retains the X.500 standard data model and can support millions of entries for a modest investment in hardware and network infrastructure.

In large corporations that employ an enterprise directory where all user, group, authentication, and application support has been consolidated, the directory tends to have multiple audiences, multiple use cases, and supports numerous applications. The directory may contain data intended for Intranet use by employees, as well as business-to-consumer (B2C) data about and for customers. In fact there may be different categories of customers who interact with the directory in different ways, via different interfaces. Current solutions to support the different categories of customers who interact with the directory in different ways may include;

1) Access control information may be set up in the directory to control access based on user group membership. However, setting up access control information requires careful attention to maintaining proper group memberships, increasing in complexity as the number of different categories of users increases, and the use of groups does not scale well with many directories.
2) Different applications may be custom designed to provide the intended interaction to each of the user categories. However, customizing different applications places a burden on the applications to handle proper access control, and may not be applied in an environment with off-the-shelf apps included.
3) Partial (filtered) replication may be used to create multiple replicas of the directory, each containing the appropriate subset of the data for access by one or more categories of users. However, partial replication dramatically increases the administrative burden to maintain multiple copies of the directory, monitor the on-going replication activity, and duplicate data.

SUMMARY

In one illustrative embodiment, a method, in a data processing system, is provided for filtering LDAP requests and server responses. The illustrative embodiment configures a viewport server with filtering rules for responses from a directory server. In the illustrative embodiments the responses are generated to fulfill requests from a client application. In the illustrative embodiment the filtering rules determine which data is to be forwarded to the client application. The illustrative embodiment intercepts one or more responses from the directory server to the client application. The illustrative embodiment filters the one or more intercepted responses according to the filtering rules to produce a set of filtered responses. The illustrative embodiment sends the set of filtered responses to the client application.

In other illustrative embodiments, a computer program product comprising a computer useable or readable medium having a computer readable program is provided. The computer readable program, when executed on a computing device, causes the computing device to perform various ones, and combinations of the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative, embodiments when read in conjunction with the accompanying drawings, wherein.

DETAILED DESCRIPTION

Figure 1:
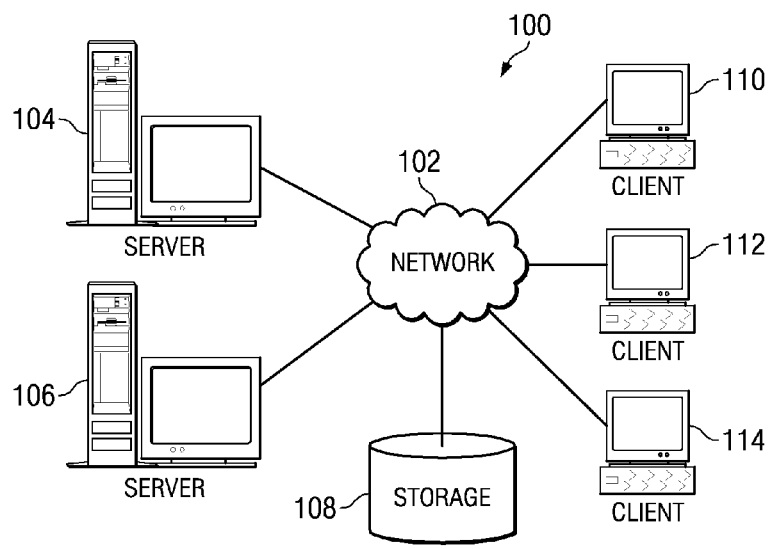
FIG. 1 depicts a pictorial representation of an example distributed data processing system in which aspects of the illustrative embodiments may be implemented.

The illustrative embodiments provide a mechanism that implements a simpler solution to support different categories of customers who interact with a directory. The illustrative embodiments provide a set of viewports where each viewport provides a different view of content in the directory. Each viewport is a process configured to listen on a port, read requests, and pass the requests to a central directory. The viewport is configured to filter data based on suffix, object class, attribute values, a hash of the distinguished name (DN), or other such rules. Viewports do not have a copy of any of the data. The viewports filter the data going to the clients to provide a specific view of the content. By filtering the data retrieved from the directory, there is no duplication of data. The filtering rules and port numbers are configured up front. Each application serving a category of users may be directed to the appropriate set of ports to get the intended view of the data for those users. Providing viewports minimizes the impact of the varying user groups on the access control and structure of the directory.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
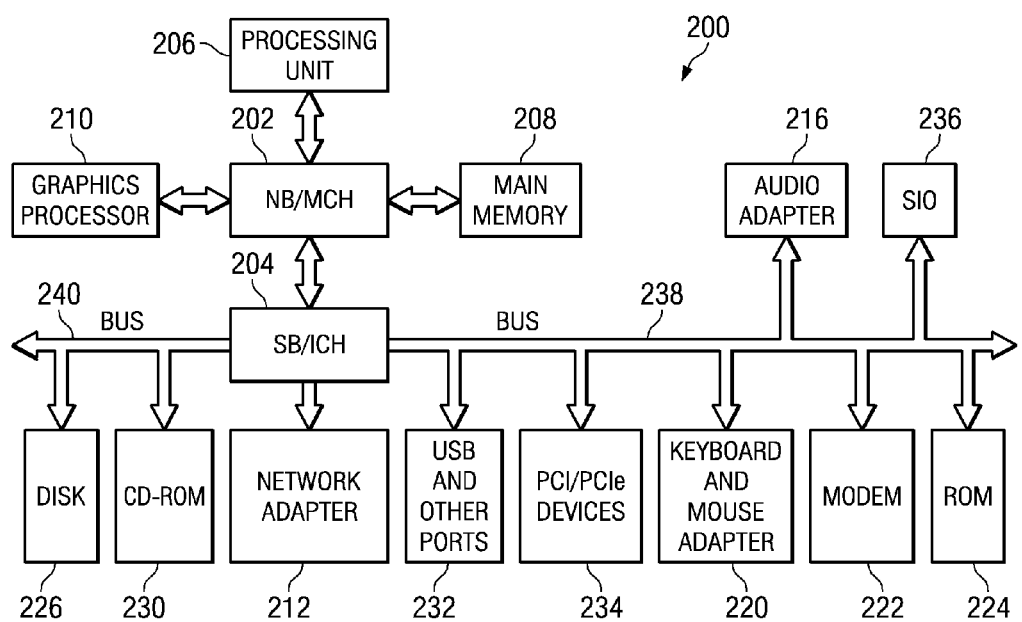
FIG. 2 shows a block diagram of an example data processing system is shown in which aspects of the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation of a mechanism that comprises a set of viewports where each viewport provides a different view of content in the directory, this is only an example and is not intended to state or imply any limitation with regard to the features of the present invention. To the contrary, the illustrative embodiments are intended to include distributed data processing environments and embodiments in which a set of viewports may be deployed where each viewport provides a different view of content in the directory.

With reference now to the figures and in particular with reference to FIGS. 1-2, example diagrams of data processing environments are provided in which illustrative embodiments of the present invention may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

The illustrative embodiments provide a mechanism where a set of viewports are deployed. Each viewport in the set of viewports provides a different view of content in the directory. Each viewport is a process configured to listen on a port, read requests, and pass the requests to a central directory. The viewport is also configured to filter data based on suffix, object class, attribute values, a hash of the distinguished name (DN), or other such rules. The viewports filter the data coming from the directory server going to the clients to provide a specific view of the content.

Figure 3:
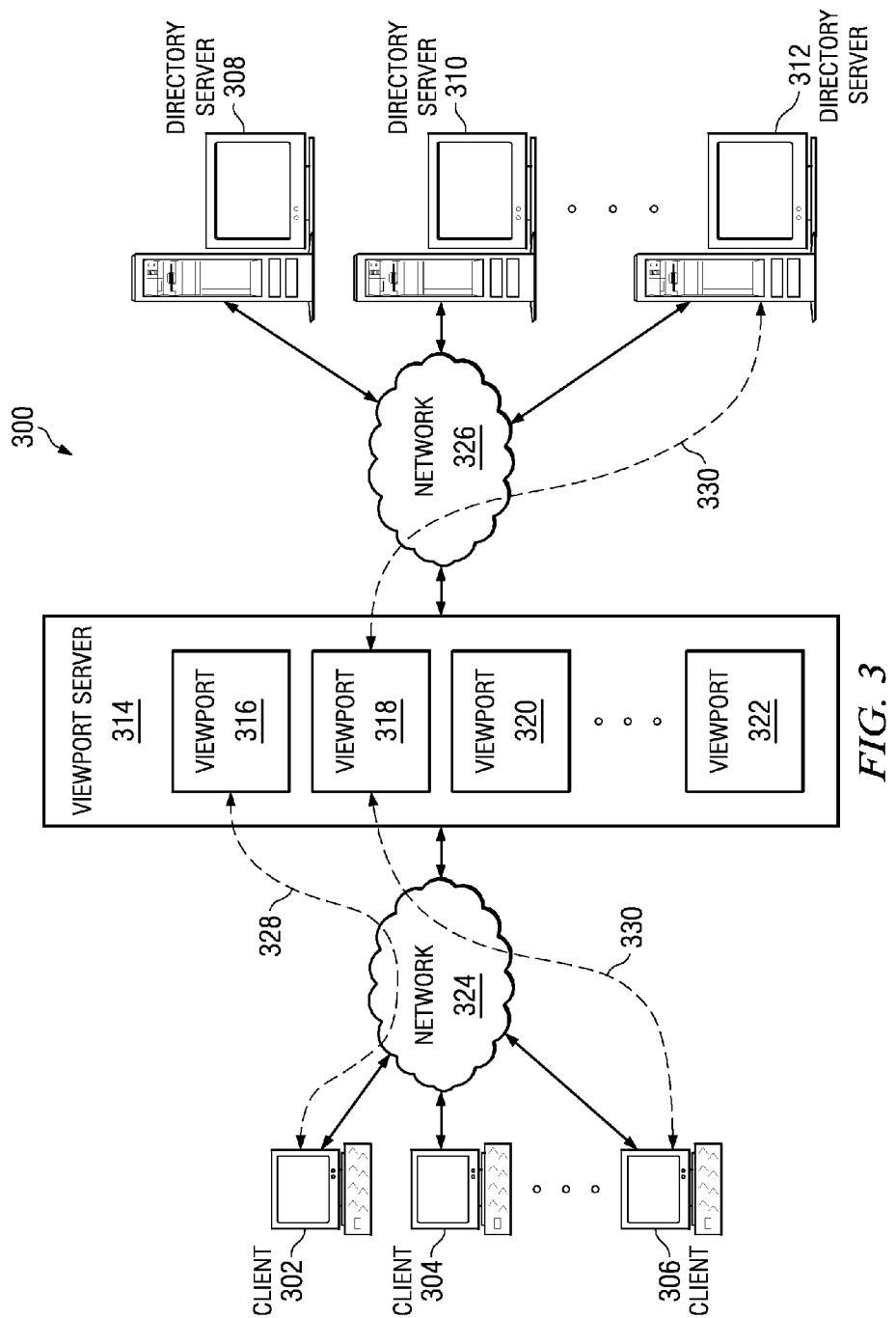
FIG. 3 depicts an example of a functional block diagram of a data processing system in which a viewport mechanism is implemented in accordance with an illustrative embodiment.

FIG. 3 depicts an example of a functional block diagram of a data processing system in which a viewport mechanism is implemented in accordance with an illustrative embodiment. Data processing system 300 may comprise clients 302, 304, and 306, directory servers 308, 310, and 312, and viewport server 314. Client applications on clients 302, 304, and 306 may be coupled to one or more of viewports 316, 318, 320, and 322 in viewport server 314. Each of viewports 316, 318, 320, and 322 is then coupled to one of directory servers 308, 310, and 312 with which the specific one of viewports 316, 318, 320, and 322 is associated. An individual viewport may be associated with separate applications or users running on one or more of clients 302, 304, and 306 and, further, an individual viewport may be associated with more than one application running on a single client as long as the applications require the same filtering offered by the individual viewport.

Each of viewports 316, 318, 320, and 322 may also be coupled to directory servers 308, 310, and 312 through networks 324 and 326. However, a single viewport may also be coupled to multiple directory servers through a proxy server or may connect to another viewport. That is, a viewport is required to connect to at least one logical directory. A proxy server provides a single contact point for a directory whose content has been partitioned across multiple servers. Networks 324 and 326 may be any type of network, including a local area network (LAN) or a wide area network (WAN), or the connection may be made to an external computer (for example, through the Internet using an Internet Service Provider).

Viewport server 314 may comprise numerous viewports, such as viewports 316, 318, 320, and 322. Although FIG. 3 depicts only one viewport server, viewport server 314, there may be many viewport servers comprising any number of viewports. In configuring client applications running on clients 302, 304, and 306, each client application may have access limitations, based on client application requirements, to the data on directory servers 308, 310, and 312. The client application requirements may be based on the access needed by employees for employee or business data, the access needed by customers for business-to-consumer (B2C) data, or the like. Thus, each of viewports 316, 318, 320, and 322 is a filtering process that provides a separate view of directory data in one of directory servers 308, 310, or 312 with which it is associated, based on a configured set of filtering rules.

Each of viewports 316, 318, 320, and 322 controls access by an application or user such that the client application or user may access only a subset of the information on directory servers 308, 310, and 312 for which the client application or user is authorized. By implementing the set of filtering rules in viewports 316, 318, 320, and 322, filtering is configured and handled outside of directory servers 308, 310, or 312. Thus, the filtering implemented by viewports 316, 318, 320, and 322 reduces the work load of directory servers 308, 310, or 312 because requests that are filtered out by viewports 316, 318, 320, and 322 are never seen by directory servers 308, 310, or 312. Viewports 316, 318, 320, and 322 simplify the access control that must be maintained in directory servers 308, 310, or 312 by handling numerous access decisions externally.

Each of the filter rules for a client application is specified by the client. Each of the filtering rules enables the client some selectivity in what the client is asking for. The filter rules are configured at the viewport and control the "view" of the directory data that is made available—independent of what a user may ask for. Thus, the filtering rules implemented by viewports 316, 318, 320, and 322 may be based on a rule set, so that certain object classes, attributes, or the like are visible (or not) through viewports 316, 318, 320, and 322. The filtering rules may also be based on suffixes, naming contexts, or the like that may or may not be accessed. Additionally, the filtering rules may be based on processing the Distinguished Name (DN), which uniquely identifies an entry in the directory, through a configured function, a hash of the entry names, or the like. While the illustrative embodiments provide only a few examples of filtering rules, there are many other possible filtering rules that may be applied without departing from the spirit or scope of the invention. Additionally, the filtering rules may be applied in combination, so that, for example, through a particular one of viewports 316, 318, 320, or 322, only one specific subtree of directory servers 308, 310, or 312 is visible, and within that subtree, a specified list of attributes are excluded from view. These filtering rules may be used to limit access to specific data in the directory, based on any filtering that could be defined on the directory requests and responses making up the protocol. This has advantages over adding access controls to the directory itself because the filtering is done in a process separate from the directory server, reducing the workload of the directory server and simplifying the access controls that must be applied and maintained in the directory.

Initially each client application running on clients 302, 304, and 306 are configured to communicate with one or more of viewports 316, 318, 320, and 322 and each of viewports 316, 318, 320, and 322 is configured with their specific filtering rules. The configuration of a client application on one or more of clients 302, 304, and 306 may comprise specifying a hostname, port, or the like, of one of viewports 316, 318, 320, and 322 for the client application to connect to. Generally, a client application is configured with information about the viewport to which the client application is coupled. In cases where the same client application is used on multiple clients, such as clients 302, 304, and 306, by different groups of users, then each instance of the client application may be configured to connect to a different viewport.

Once each of viewports 316, 318, 320, and 322 is configured with filtering rules for its associated client application(s) or user(s), then viewports 316, 318, 320, and 322 reads any requests coming in to its port(s) from a client application or user on clients 302, 304, and 306 and scans the requests for anything, such as an operation, attribute, or the like, that needs to be filtered out based on the configured filtering rules. During the filtering process, viewports 316, 318, 320, and 322 may reject entire requests. For example, if the filtering rules within viewport 316 indicate that only a specific subtree is included in the view and the request 328 to directory server 308 from client 302 attempts to add an entry outside of that area, viewport 316 prevents the request from passing through. Viewport 316 may then respond to client 302 with an appropriate error result code, such as "No Such Object." In other cases, viewports 316, 318, 320, and 322 may alter a request from clients 302, 304, and 306. For example, a search request 330 from client 306 to directory server 312 may request attributes not included in the view of the filtering rules of viewport 318. Viewport 318 may eliminate the attributes in the inbound request, to cut down on the data traffic coming back from directory server 312. Once viewport 318 completes the inbound filtering, the search request is forwarded to directory server 312, assuming a valid request still remains after the initial filtering.

For some requests, such as an update request, viewports 316, 318, 320, and 322 may have completed their work and will simply forward the response received from directory servers 308, 310, and 312 back to clients 302, 304, and 306. But for search requests, data returned from directory servers 308, 310, and 312 may require another phase of filtering in viewports 316, 318, 320, and 322. The other phase of filtering may be performed by viewports 316, 318, 320, and 322, or viewport server 314 may have other viewports designated to filtering response data from directory servers 308, 310, and 312. In this example, viewports 316, 318, 320, and 322 perform both the filtering of the request and the response data. Thus, at this point, viewports 316, 318, 320, and 322 remove any data that should not be visible (according to the filtering rules with which the viewport is configured) from the search results. Then, viewports 316, 318, 320, and 322 send the remaining data onto clients 302, 304, and 306. While the filtering performed by viewports 316, 318, 320, and 322 may add to the response time of an request, overall throughput should not be impacted because processing by viewports 316, 318, 320, and 322 is minor compared to the work performed by directory servers 308, 310, and 312.

Thus, the viewport mechanism of the illustrative embodiments filter request and server responses to requests based on the access limitations of the particular client application. Each viewport is configured with filtering rules for the particular client application from which the viewport will receive requests. Then, when the viewport receives a request, the viewport determines if the request meets the configured filtering rules. If the request does not meet the configured filtering rules, the viewport may return an error or filter the request using the configured filtering rules to remove any operations or accesses to particular data that the viewport is not configured to allow. Once the viewport has filtered the request, the viewport sends the request to the directory server with which the viewport is associated and waits for a response. Once the viewport receives a response, the viewport filters the response, if necessary, for any data that should not be sent to the client application, based on the configured filtering rules. Then the viewport sends the response to the client application.

The following are examples of the filtering performed by a viewport mechanism. The first example illustrates a Human Resources application used to maintain information about employees of Acme Insurance. In this example, the viewport filters out user passwords and authentication information, but gives access to all "personal" and employment information about the employees, such as Telephone Number, Car License, Employee Type, Employee Number, Department Number, or the like. The Human Resources application only accesses entries that are within the Acme Insurance part of the tree. This could be useful if different branches of a directory tree host information for different companies (because the directory was outsourced or because the companies are all owned by one parent company).

This filtering performed by the viewport mechanism works as follows:
    Filtering of inbound request from a client application:
        Any directory operation requested that references any entry outside of the o=Acme Insurance, c=us part of the directory is rejected at the viewport.
        Any Add or Modify request that includes the four excluded attributes will have those attributes eliminated.
        Any Search request with a search filter referencing any of the four excluded attributes will be rejected at the viewport.
        Any Search request that specifically lists any of the four excluded attributes in the requested attribute list will have those attribute names removed from the attribute list.
        Any Compare request attempting to compare values of any of the four excluded attributes will be rejected at the viewport.
    Filtering of an outbound response to a client application:
        Any search results that include any of the four excluded attributes will have those attributes and values removed from the result entries before the viewport forwards them to the client.
    Sample filter definition:
        suffix: o=Acme Insurance, c=us
        attributes: !(userPassword, userCertificate, userPKCS12, userSMIMECertificate)

The second example illustrates a "whitepages" application that Acme employees use to look up contact information about other employees. In this example, the viewport gives access only to a selected list of attributes.

Filtering of inbound request from a client application:
  Any directory operation requested that references any entry outside of the o=Acme Insurance, c=us part of the directory is rejected at the viewport.
  Any Add or Modify request that includes any outside of the permitted attributes will have those other attributes eliminated.
  Any Search request with a search filter referencing any outside of the permitted attributes will be rejected at the viewport.
  Any Search request that specifically lists any outside of the permitted attributes in the requested attribute list will have those attribute names removed from the attribute list.
  Any Compare request attempting to compare values of any outside of the permitted attributes will be rejected at the viewport.
Filtering of an outbound response to a client application:
  Any search results that include any outside of the permitted attributes will have those attributes and values removed from the result entries before the viewport forwards them to the client.
Sample filter definition:
  suffix: o=Acme Insurance, c=us
  attributes: (cn, sn, givenName, mobile, pager, postalAddress, title, telephoneNumber, description)

The third example illustrates a lookup application used by customers of Acme Insurance to lookup Insurance Agents by name, zipcode, region, or the like.
Filtering of inbound request from a client application:
  Any Update operation is rejected at the viewport.
  Any directory operation requested that references any entry outside of the o=Acme Insurance, c=us part of the directory is rejected at the viewport.
  Any Search request, with a search filter referencing any outside of the permitted attributes will be rejected at the viewport.
  Any Search request that specifically lists any outside of the permitted attributes in the requested attribute list will have those attribute names removed from the attribute list.
  Any Compare request attempting to compare values of any outside of the permitted attributes will be rejected at the viewport.
Filtering of an outbound response to a client application:
  Any search results that include any outside of the permitted attributes will have those attributes and values removed from the result entries before the viewport forwards them to the client.
Sample filter definition:
  suffix: ou=Agents, o=Acme Insurance, c=us:READONLY
  attributes: (agentName, telephoneNumber, zipCode, region, postalAddress)

The fourth example simulates the partitioning of a directory based on a hash function, similar to what a directory Proxy server does. In this example, the viewport provides access only to entries that would appear in partition #2 of a distributed directory. The distribution hash function is provided in this filter.
Filtering of inbound request from a client application:
  For Update or Compare operations, the DN specified is hashed and if the result value is not 2, then the operation is rejected with NO_SUCH_OBJECT.
  For Search requests, the base DN specified is hashed and if the result value is not 2, then the operation is rejected with NO_SUCH_OBJECT.
Filtering of an outbound response to a client application:
  The DN's of search result entries are hashed and any that do not hash to the value 2 are not forwarded to the client.
Sample filter definition:
  hash: function xyz(dn)=2

Figure 4:
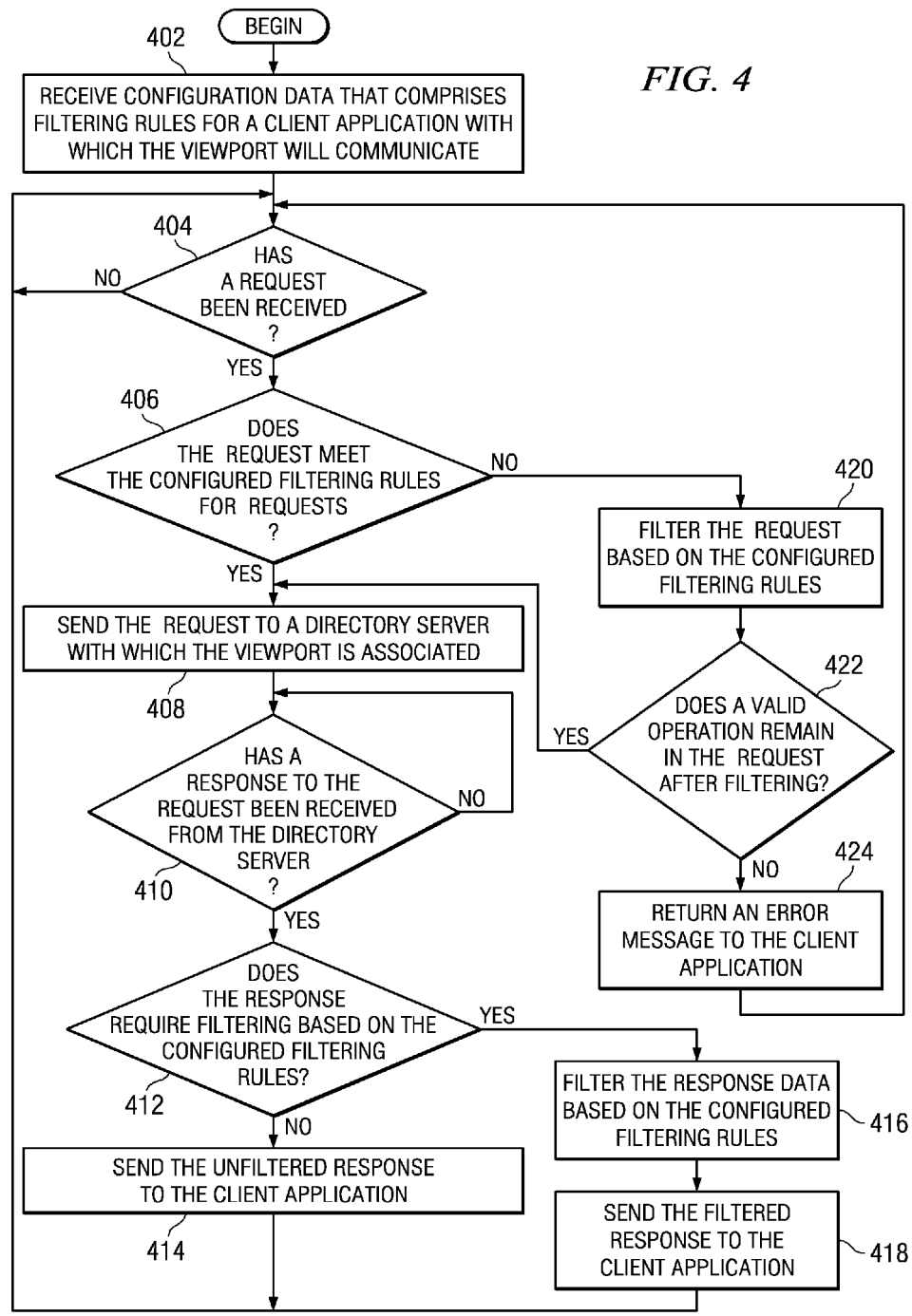
FIG. 4 depicts an example of the operation performed by a viewport in a data processing system in accordance with an illustrative embodiment.

FIG. 4 depicts an example of the operation performed by a viewport in a data processing system in accordance with an illustrative embodiment. As the operation begins, a viewport receives configuration data that comprises filtering rules to be applied to all requests received from client applications (step 402). Once the viewport is configured, the viewport determines if a request has been received (step 404). If at step 404 a request has not been received, the operation returns to step 404. If at step 404 a request has been received, the viewport determines if the request meets the configured filtering rules for requests (step 406). That is, the viewport determines if the request only include operations, attributes, or the like, for which the viewport provides access to. If at step 406 the request meets the configured filtering rules for requests, then the viewport directly sends the request to a directory server with which the viewport is associated (step 408). The viewport then determines if a response to the request has been received from the directory server (step 410).

If at step 410 a response is not received, then the viewport waits to receive a response with the operation returning to step 410. If at step 410 a response is received from the associated directory server, then the viewport determines if the response requires filtering based on the configured filtering rules (step 412). The determination may be made based on the type of request, the type of data received, or the like. If at step 412 the response does not require filtering, then the viewport sends the unfiltered response to the client application (step 414), with the operation returning to step 404 thereafter. If at step 412 the response requires filtering, then the viewport filters the response data based on the configured filtering rules (step 416). That is, the viewport scans the response data and filters out data that is not to be sent to the client application. Then the viewport sends the filtered response to the client application (step 418), with the operation returning to step 404 thereafter.

If at step 406 the request fails to meet the configured filtering rules for requests, the viewport, filters the request based on the configured filtering rules (step 420). Then, the viewport determines if a valid operation remains in the request after filtering (step 422). If at step 422 no valid operation remains in the request, then the viewport returns an error message to the client application (step 424), with the operation proceeding to step 404 thereafter. If at step 422 a valid operation does exist in the request then the operation proceeds to step 408.

Thus, the illustrative embodiments provide mechanisms for filtering requests and server responses based on the access limitations of the particular client application. Each viewport is configured with filtering rules for the particular client application from which the viewport will receive requests. Requests and responses to the requests may be filtered based on the configured filtering rules. Then the viewport sends the response to the client application.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for filtering requests and server responses, the method comprising:
    configuring a viewport server with filtering rules for responses from a directory server that maintains a collection of data that is accessible via a directory access protocol, wherein the responses are generated to fulfill requests from a client application, wherein the viewport server communicates with the directory server on behalf of the client application using the directory access protocol, wherein the filtering rules determine which data is to be forwarded to the client application, wherein the viewport server comprises a plurality of viewports, wherein each of the plurality of viewports is configured with a respective set of filtering rules for responses from the directory server, and wherein the filtering rules respectively associated with a first viewport and a second viewport within the plurality of viewports provide different types of filtering and determine which data is to be forwarded to respective client applications in a plurality of client applications coupled to the first viewport or the second viewport independent of the client application or a user using the client application;
    intercepting one or more responses from the directory server to the client application;
    filtering the one or more intercepted responses according to the filtering rules to produce a set of filtered responses; and
    sending the set of filtered responses to the client application.

2. The method of claim 1, further comprising:
    responsive to the one or more intercepted responses failing to require filtering, sending the one or more intercepted responses to the client application over a network as an unfiltered response.

3. The method of claim 1, wherein the filtering rules further comprise filtering rules for the requests.

4. The method of claim 3, further comprising:
    determining if the request from the client application meets the filtering rules for the requests; and
    responsive to the request meeting the filtering rules for requests, directly sending the request to the directory server.

5. The method of claim 4, further comprising:
    responsive to the request failing to meet the filtering rules for requests, filtering the request based on specific filtering rules for filtering the request;
    determining if at least one valid operation remains in the request after applying the specific filtering rules for filtering the request; and
    responsive to a valid operation remaining in the request after applying the specific filtering rules for filtering the request, sending the request to the directory server with which the viewport is associated.

6. The method of claim 5, further comprising:
    responsive to no valid operation remaining in the request after applying the specific filtering rules for filtering the request, returning an error message over a network to the client application.

7. The method of claim 1, wherein the filtering rules are based on a rule set.

8. The method of claim 7, wherein the rule set comprises at least one of object classes, attributes, suffixes, or naming contexts that are accessible by the client application.

9. The method of claim 7, wherein the rule set comprises at least one of object classes, attributes, suffixes, or naming contexts that are inaccessible by the client application.

10. The method of claim 7, where in the rule set comprises at least one of a configured function or a hash of entry names that can be accessed by the client application.

11. A computer program product comprising a non-transitory computer recordable medium having a computer readable program recorded thereon, wherein the computer readable program, when executed on a computing device, causes the computing device to:
    configure a viewport server with filtering rules for responses from a directory server that maintains a collection of data that is accessible via a directory access protocol, wherein the responses are generated to fulfill requests from a client application, wherein the viewport server communicates with the directory server on behalf of the client application using the directory access protocol, wherein the filtering rules determine which data is to be forwarded to the client application, wherein the viewport server comprises a plurality of viewports, wherein each of the plurality of viewports is configured with a respective set of filtering rules for responses from the directory server, and wherein the filtering rules respectively associated with a first viewport and a second viewport within the plurality of viewports provide different types of filtering and determine which data is to be forwarded to respective client applications in a plurality of client applications coupled to the first viewport or the second viewport independent of the client application or a user using the client application;
    intercept one or more responses from the directory server to the client application;
    filter the one or more intercepted responses according to the filtering rules to produce a set of filtered responses; and
    send the set of filtered responses to the client application.

12. The computer program product of claim 11, wherein the filtering rules further comprise filtering rules for the requests.

13. The computer program product of claim 12, wherein the computer readable program further causes the computing device to:

determine if the request from the client application meets the filtering rules for the requests; and responsive to the request meeting the filtering rules for requests, directly send the request to the directory server.

14. The computer program product of claim 13, wherein the computer readable program further causes the computing device to:

responsive to the request failing to meet the filtering rules for requests, filter the request based on specific filtering rules for filtering the request;

determine if at least one valid operation remains in the request after applying the specific filtering rules for filtering the request; and responsive to a valid operation remaining in the request after applying the specific filtering rules for filtering the request, send the request to the directory server with which the viewport is associated.

15. The computer program product of claim 14, wherein the computer readable program further causes the computing device to:

responsive to no valid operation remaining in the request after applying the specific filtering rules for filtering the request, return an error message over a network to the client application.

16. An apparatus, comprising:

a processor; and a memory coupled to the processor, wherein the memory comprises instructions which, when executed by the processor, cause the processor to:

configure a viewport server with filtering rules for responses from a directory server that maintains a collection of data that is accessible via a directory access protocol, wherein the responses are generated to fulfill requests from a client application, wherein the viewport server communicates with the directory server on behalf of the client application using the directory access protocol, wherein the filtering rules determine which data is to be forwarded to the client application, wherein the viewport server comprises a plurality of viewports, wherein each of the plurality of viewports is configured with a respective set of filtering rules for responses from the directory server, and wherein the filtering rules respectively associated with a first viewport and a second viewport within the plurality of viewports provide different types of filtering and determine which data is to be forwarded to respective client applications in a plurality of client applications coupled to the first viewport or the second viewport independent of the client application or a user using the client application;

intercept one or more responses from the directory server to the client application;

filter the one or more intercepted responses according to the filtering rules to produce a set of filtered responses; and send the set of filtered responses to the client application.

17. The apparatus of claim 16, wherein the filtering rules further comprise filtering rules for the requests.

18. The apparatus of claim 17, wherein the instructions further cause the processor to:

determine if the request from the client application meets the filtering rules for the requests; and responsive to the request meeting the filtering rules for requests, directly send the request to the directory server.

19. The apparatus of claim 18, wherein the instructions further cause the processor to:

responsive to the request failing to meet the filtering rules for requests, filter the request based on specific filtering rules for filtering the request;

determine if at least one valid operation remains in the request after applying the specific filtering rules for filtering the request; and responsive to a valid operation remaining in the request after applying the specific filtering rules for filtering the request, send the request to the directory server with which the viewport is associated.

20. The apparatus of claim 19, wherein the instructions further cause the processor to:

responsive to no valid operation remaining in the request after applying the specific filtering rules for filtering the request, return an error message over a network to the client application.

21. The method of claim 1, wherein, responsive to one or more client applications in the plurality of client applications requiring a same type of filtering, the one or more applications are coupled to a same viewport in the plurality of viewports that provides the required type of filtering.

22. The computer program product of claim 11, wherein, responsive to one or more client applications in the plurality of client applications requiring a same type of filtering, the one or more applications are coupled to a same viewport in the plurality of viewports that provides the required type of filtering.

23. The apparatus of claim 16, wherein, responsive to one or more client applications in the plurality of client applications requiring a same type of filtering, the one or more applications are coupled to a same viewport in the plurality of viewports that provides the required type of filtering.

* * * * *